United States Patent Office 3,565,920
Patented Feb. 23, 1971

3,565,920
5-SULFAMYL-ANTHRANILIC ACIDS
Lincoln Harvey Werner, Summit, N.J., assignor to Ciba Corporation, New York, N.Y., a corporation of Delaware
No Drawing. Continuation-in-part of application Ser. No. 553,724, May 1, 1966. This application Dec. 29, 1966, Ser. No. 605,605
Int. Cl. C07d 5/14
U.S. Cl. 260—347.2                    2 Claims

ABSTRACT OF THE DISCLOSURE

N-aliphatically substituted 5-sulfamyl - 4 - halo-anthranilic acids of the Formula I

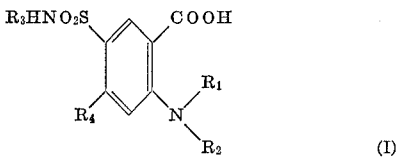

$R_1$ = aliphatic or araliphatic hydrocarbon radical
$R_2$ = H, $R_1$ or acyl
$R_3$ = cycloaliphatic or araliphatic hydrocarbon radical
$R_4$ = Cl or Br esters and salts thereof, particularly the N-furfuryl-4-chloro-5-benzylsulfamyl-anthranilic acid, exhibit diuretic effects.

CROSS-REFERENCE

This is a continuation-in-part of application Ser. No. 553,724, filed May 31, 1966, now abandoned.

SUMMARY

The present invention concerns and has for its object the provision of new N-aliphatically substituted 5-sulfamyl-4-halo-anthranilic acids and their acid derivatives, more particularly those of Formula I, in which $R_1$ stands for an aliphatic or araliphatic hydrocarbon radical, $R^2$ for hydrogen or an aliphatic or araliphatic hydrocarbon or acyl radical, $R_3$ for a cycloaliphatic or araliphatic hydrocarbon radical and $R_4$ for chloro or bromo, esters thereof and salts of these compounds, as well as corresponding pharmaceutical compositions, new starting materials and methods for the preparation of the new compounds.

The aliphatic or araliphatic hydrocarbon radicals mentione dabove may also be interrupted by hetero atoms, such as nitrogen, oxygen and/or sulfur atoms. Aliphatic radicals $R_1$ and $R_2$ are, for example, lower alkyl, such as methyl, ethyl, n- or i-propyl, -butyl, -pentyl, -hexyl or -heptyl, lower alkenyl, such as vinyl, allyl, methallyl or 2-butenyl, lower alkynyl, such as propargyl, cycloalkyl, cycloalkenyl, cycloalkyl-lower alkyl or cycloalkenyl-lower alkyl which may be mono- or bicyclic and have preferaby 3 to 7 ring-carbon and 1 to 4 chain-carbon atoms, such as cyclopropyl, 2,3-dimethyl-cyclopropyl, cyclobutyl, cyclopentyl, 2- or 3-methyl-cyclopentyl, 2,5- or 3,4-dimethyl-cyclopentyl, cyclohexyl, 2-, 3- or 4-methyl-cyclohexyl, 2,3-, 2,4- or 3,5-dimethyl-cyclohexyl, 2,4,6-trimethyl-cyclohexyl, cycloheptyl, cyclooctyl, 2- or 7-norbornanyl, 1- or 2-decahydronaphthyl and the corresponding cycloalkyl-lower alkyl groups, in which the chain especially represents methyl, but also ethyl, propyl, straight or branched butyl, and contains in any of the positions available for substitution one of the specific cycloalkyl groups listed above. A cycloalkenyl or cycloalkenyl-lower alkyl group represents, for example, 1- or 2-cyclopentyl, 2,4-cyclopentadienyl, 2- or 3-methyl-2-cyclopentenyl, 4,5-dimethyl-2-cyclopentenyl, 1-, 2- or 3-cyclohexenyl, 2,5-cyclohexadienyl, 2-, 3- or 4-methyl-1- or 2-cyclohexenyl, 2,4- or 3,5-dimethyl-1- or 2-cyclohexenyl, 2,4,6-trimethyl-2,5-cyclohexadienyl, 1-, 2- or 3-cycloheptenyl, 2,6-cycloheptadienyl, 2-cyclooctenyl or 2-norborn-5-enyl and the corresponding cycloalkenyl-lower alkyl groups in which the chain has the previously-given meaning and contains in any of the positions available for substitution one of the specific cycloalkenyl groups listed above. $R_1$ and $R_2$, when taken together, may also represent lower alkylene or alkenylene, such as ethylene, 1,3-propylene, 1,4-butylene, 1,4- or 1,5-pentylene, 1,5-, 2,5- or 1,6-hexylene or 2,6-heptylene; 1,4-but-2-enylene, 1,4- or 1,5-pent-2-enylene, 1,5-hex-2-enylene, 1,6-hex-3-enylene or 2,6-hept-3-enylene. An araliphatic hydrocarbon radical $R_1$ and $R_2$ preferably stands for mono- or bicyclic carbocyclic aryl-lower alkyl or aryl-lower alkenyl, but also for mono- or bicyclic heterocyclic, especially mono-aza, oxa- or thiacyclic aryl-lower alkyl or aryl-lower alkenyl in which the lower alkyl or alkenyl moiety preferably has up to 4 chain-carbon atoms, such as benzyl, 1- or 2-phenylethyl, 1-, 2- or 3-phenyl-propyl, 2-phenyl-2-propyl, 1-, 2-, 3- or 4-phenylbutyl, 1- or 2-phenyl-2-butyl; styryl or cinnamyl, and the corresponding heterocyclic aralkyl or aralkenyl radicals in which aryl is, for example, 2-, 3- or 4-pyridyl, 2- or 3-furyl or -thienyl, 5-(1,2-oxazolyl), 2-(1,3-oxazolyl), 2-(1,3-thiazolyl) or 2-benzimidazolyl. Araliphatic hydrocarbon radicals are also partially hydrogenated, preferably bi- or tricyclic aryl radicals, bound at the aliphatic portion, such as 1- or 2-indolinyl, 1- or 2-(1,2,3,4-tetrahydronaphthyl) or 9-fluorenyl. Hydrocarbon radicals that are interrupted by hetero atoms are represented, for example, by aza-, oxa or thia-alkenylene, such as 3-aza-, 3-oxa- or 3-thia-pentylene-(1,5), 3-methyl or ethyl-3-aza-pentylene-(1,5), 3-aza-hexylene-(1,6), or 4-aza- or oxa-heptylene-(2,6), furthermore by sec. or tert. amino-lower alkyl, such as mono- or di-lower alkylamino-lower alkyl, alkyleneimino-lower alkyl, aza-, oxa- or thia-alkyleneimino-lower alkyl, e.g. 2 - ethylamino-ethyl, 2 - dimethylamino-ethyl, 3 - diethylamino-propyl, 2-pyrrolidino-ethyl, 2-piperidino-ethyl, 2-(4-methyl-piperazino)-ethyl or 2-morpholino-ethyl, by lower alkoxy- or alkyl-mercapto-lower alkyl, oxa-cycloalkyl or oxa-cycloalkyl-lower alkyl, such as 2-ethoxy-ethyl, 3-methoxy-propyl, 2-ethylmercapto-ethyl, 3-tetrahydrofuryl, tetrahydro-2-furylmethyl, 2,3-dihydro- or tetrahydro-2-pyranylmethyl.

These radicals may be unsubstituted or substituted, especially in the aromatic portion, by one or more than one of the same or of different substituents, for example, lower alkyl groups, such as those mentioned above, free or funtionally converted hydroxy or mercapto groups, such as lower alkoxy or alkylmercapto, halogen, e.g. fluoro, chloro or bromo, trifluoromethyl, nitro, amino, especially di-lower alkylamino, e.g. dimethylamino or diethylamino, sulfamyl, carbamyl, or cyano. Such substituted aliphatic radicals are, for example, lower haloalkyl, e.g. 2 - chloro-, bromo- or iodo - ethyl, 2,2-difluoro- or dichloro - ethyl, 3,3,3 - trichloro-ethyl, 2- or 3-fluoro- or chloropropyl or 2,2-dichloropropyl, halogenated lower alkoxy- or alkylmercapto - lower alkyl, such as 2-(2-chloroethoxy)-ethyl, 2-(2,2-dichloroethoxy)-ethyl, 2 - (2,2,2, - trifluoroethyl - mercapto) - ethyl or 2 - (2,2 - dichloroethylmercapto) - ethyl, carbamyl-lower alkyl, such as carbamyl - methyl, N,N - dimethylcarbamyl - methyl, 2 - carbamyl - ethyl or 2 - N,N - diethylcarbamyl - ethyl. In the compounds containing the above aliphatic radicals, two hetero atoms are separated by at least 2 carbon atoms. Preferred substituted aryl moieties present in the araliphatic radicals are (lower alkyl)-phenyl, (lower alkoxy) - phenyl, (lower alkylmercapto)-phenyl, (halogeno) - phenyl, (trifluoromethyl) - phenyl and (di-lower alkylamino)-phenyl.

An acyl radical, $R_2$ preferably, stands for lower alkanoyl, such as acetyl, propionyl, butyryl or pivalyl, but also for lower alkenoyl, such as acryloyl or methacryloyl, monocyclic carbocyclic aroyl or aryl-lower alkanoyl or alkenoyl, such as benzoyl, phenylacetyl or cinnamoyl. These acyl radicals may be unsubstituted or substituted as shown for the above hydrocarbon radicals.

The radical $R_3$ preferably stands for cycloalkyl, cycloalkenyl, cycloalkyl-lower alkyl, cycloalkenyl-lower alkyl, mono- or bicyclic carbocyclic or heterocyclic aryl-lower alkyl or aryl-lower alkenyl, e.g. that mentioned above for $R_1$ and $R_2$.

Esters of the compounds of formula I are particularly those of lower alkanols, such as methanol, ethanol, 1- or 2-propanol, 1-, 2- or tert. butanol, or monocyclic carbocyclic aryl-lower alkanols, such as benzyl alcohol or 2-penyl-ethanol.

The compounds of the invention exhibit valuable pharmacological properties. Primarily they show diuretic and natriuretic activity with rapid onset of action and high sodium excretion levels, as can be demonstrated in animal tests using, for example, mammals, e.g. rats or dogs as test objects. They are, therefore, useful as orally applicable diuretic and natriuretic agents in order to relieve excessive water and/or salt retention, for example, in connection with heart and kidney diseases, and the adjunctive management of hypertension. Furthermore, they can be used as intermediates in the preparation of other valuable products, primarily of pharmacologically active compounds.

Particularly useful are the compounds of Formula II

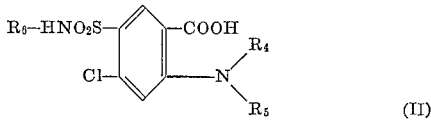

(II)

in which $R_4$ stands for lower alkyl, lower alkenyl, cycloalkyl, cycloalkenyl, cycloalkyl-alkyl or cycloalkenyl-alkyl with 5 to 7 ring-carbon and 1 to 4 chain-carbon atoms, monocyclic carbocyclic or monaza-, oxa- or thiacyclic aryl-alkyl with 1 to 4 chain-carbon atoms, lower fluoro- or chloroalkyl, lower alkoxy- or alkylmercapto-lower alkyl, lower fluoro- or chloroalkoxy- or -alkyl-mercapto-lower alkyl, di-lower alkylamino- or lower alkyleneimino-lower alkyl, $R_5$ for hydrogen, lower alkyl or lower alkanoyl and $R_6$ for cycloalkyl, cycloalkenyl, cycloalkylalkyl or cycloalkyl with 5 to 7 ring-carbon and 1 to 4 chain-carbon atoms, monocyclic carbocyclic or monoaza-, oxa- orthia-cyclic aryl-alkyl with 1 to 4 chain-carbon atoms, wherein 2 hetero atoms in the aliphatic radicals are separated by at least 2 carbon atoms and carbocyclic aryl is unsubstituted or substituted by lower alkyl, lower alkoxy, lower alkylmercapto, halogeno, trifluoromethyl or di-lower alkylamino and heterocyclic aryl is unsubstituted or substituted by lower alkyl, and alkali metal, alkaline earth metal or ammonium salts thereof.

Especially valuable are the compounds of Formula II in which each of $R_4$ and $R_6$ stand for benzyl, 1- or 2-phenylethyl, furfuryl or thenyl and $R_5$ for hydrogen, benzyl or alkanoyl with 1 to 4 carbon atoms ,and alkali metal, alkaline earth metal or ammonium salts thereof, which when given to rats at oral doses between about 25 and 100 mg./kg./day, show outstanding diuretic activity.

The compounds of the invention are prepared according to methods in themselves known. Advantageously they are obtained by (a) reacting a compound of the Formula III

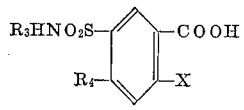

(III)

in which X stands for halogen, preferably fluoro or chloro, or an ester, halide, amide or hydrazide thereof, with the amine $R_1$—NH—$R_2$ and hydrolyzing any resulting amide or hydrazide, or (b) reacting a compound of the Formula IV

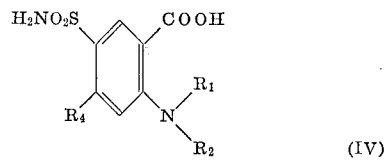

(IV)

or an ester thereof, with a reactive ester of the alcohol $R_3$—OH and, if desired, converting any resulting compound into another disclosed compound.

Any ester used as starting material may be such as described above for the final products. The amides or hydrazides used as starting materials may be N-unsubstituted or N-substituted, for example, by one or more than one aliphatic, araliphatic or aromatic radical, e.g. any of those described above. The reactive ester of the alcohol is preferably such of a strong mineral or sulfonic acid, e.g. hydrochloric, hydrobromic, sulfuric or p-toluenesulfonic acid.

The above process is carried out according to standard methods, in the presence or absence of diluents, preferably such as are inert to the reagents and are solvents thereof, of catlysts, condensing agents and/or inert atmospheres, at low temperatures, room temperature or advantageously elevated temperatures, at atmosphereic or superatmospheric pressure.

In the above reaction the amine reagent is advantageously used in excess, in order to neutralize the generated acid. It may, however, also be used in equivalent amounts and in the presence of other condensing agents such as inorganic or organic bases, e.g. alkali metal carbonates or bicarbonates or tertiary nitrogen bases, for example, tri-lower alkylamines, N,N-dimethylaniline or pyridine.

Any resulting amide or hydrazide is hydrolyzed in the usual manner, for example, with the use of an alkali, e.g. aqueous alkali or alkaline earth metal hydroxides, or quaternary ammonium hydroxides. The compounds of the invention so obtained may be converted into each other according to known methods. For example, resulting compounds in which $R_2$ stands for hydrogen, may be reacted with a reactive ester of a corresponding alcohol, for example, that of a hydrohalic or sulfonic acid, or may be acylated, for example, with a reactive functional derivative of a corresponding acid, such as a halide or anhydride thereof, or resulting acyl derivatives may be hydrolyzed, for example with the use of acidic or alkaline hydrolyzing agents. Resulting esters may be hydrolyzed or transesterified or resulting acids esterified in known manner.

The compounds of the invention are obtained in the free form or in the form of their salts, depending on the conditions under which the process is carried out, the salts are also included in the present invention. These are particularly derived from the free acids and therapeutically useful inorganic or organic bases, primarily the alkali metal, alkaline earth metal, e.g. sodium, potassium, magnesium or calcium salts, or ammonium salts derived from ammonia or amines, such as those corresponding to the amino group

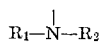

e.g. mono-, di- or tri-lower alkylamines, -cycloalkylamines, -cycloalkyl-lower alkylamines, or -aralkylamines, mixed amines or quaternary nitrogen bases, such as pyridine, collidine or lutidine.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the starting material in reaction (b) is advantageously used in the form of a salt, preferably an alkali metal salt, which, in case the free acids are used, is usually the dibasic salt. In case the amine $R_1$—NH—$R_2$ is identical with $R_3$—$NH_2$, it may be reacted in a single step with a 2,4-dihalo-5-halosulfonyl-benzoic acid or a functional derivative thereof, whereby compounds of the Formula III are derivatives thereof, are formed under the reaction conditions. Mainly, those starting materials should be used in the reactions of the invention that lead to the formation of those compounds indicated above as being especially valuable.

The starting material is new, but can be prepared according to known methods. For example, a corresponding 2,4-dihalo-benzoic acid is reacted with chlorosulfonic acid in order to yield the 2,4-dihalo-5-chlorosulfonyl-benzoic acid. The latter, or a functional derivative thereof, is either first reacted with ammonia and then with the amine $R_1$—NH—$R_2$ to yield the compounds of Formula IV or their corresponding derivatives, or reacted with the amine $R_3$—$NH_2$ in order to obtain the compounds of Formula III, or functional derivatives thereof. The latter, e.g. the esters, halides, amides or hydrazides, may also be prepared from the acids of Formula III by conventional methods.

The pharmacologically active compounds of the invention can be used for example, for the manufacture of pharmaceutical compositions, containing them in conjunction or admixture with inorganic or organic, solid or liquid pharmaceutical excipients suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. These compositions are prepared by conventional methods; they usually contain about 0.1 to 75%, particularly 1 to 50% of the active ingredient.

The following examples illustrate the invention and are not to be construed as being limitations thereon. Temperatures are given in degrees centigrade and all parts wherever given are parts by weight.

Example 1

The mixture of 3.6 g. 2,4-dichloro-5-benzylsulfamyl-benzoic acid, 10 ml. 2-methoxy-ethanol and 4.3 g. benzylamine is refluxed for 4 hours under nitrogen. After cooling to room temperature, it is poured into 50 ml. 2 N hydrochloric acid, the precipitate formed, allowed to crystallize and filtered off. The residue is dissolved in 2 N aqueous sodium hydroxide, the solution extracted with diethyl ether, the aqueous layer separated and acidified with concentrated hydrochloric acid. The precipitate is collected, triturated with aqueous ethanol and recrystallized from ethanol, to yield the N-benzyl-5-benzylsulfamyl-4-chloroanthranilic acid of the formula

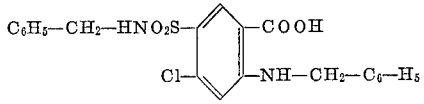

melting at 200–202°.

The starting material is prepared as follows: To 250 g. chlorosulfonic acid 50 g. 2,4-dichloro-benzoic acid are added portion-wise at room temperature while stirring. The solution obtained is heated to about 180° and stirred for 3 hours. After cooling to room temperature, it is poured onto ice, the mixture filtered, the residue washed with water, and dissolved in 400 ml. ethyl acetate. The solution is dried, filtered, evaporated, and the residue triturated with hexane, to yield the 2,4-dichloro-5-chlorosulfonyl-benzoic acid.

20.0 g. thereof are added portion-wise to the stirred solution of 30 g. benzylamine in 150 ml. ethyl acetate at room temperature. Hereupon 150 ml. ethyl acetate are added and the mixture is stirred for 4 hours. It is filtered, the residue washed with ethyl acetate, dried, and dissolved in 200 ml. water. The solution is acidified with 30 ml. concentrated hydrochloric acid, the precipitate formed filtered off, and recrystallized from aqueous ethanol to yield the 2,4-dichloro-5-benzylsulfamylbenzoic acid, melting at 180–182°.

Example 2

The mixture of 3.6 g. 2,4-dichloro-5-benzylsulfamyl-benzoic acid, 10 ml. 2-methoxy-ethanol and 3.9 g. furfurylamine is refluxed for 4 hours under nitrogen. It is worked up as described in Example 1 to yield the N-furfuryl-4-chloro-5-benzylsulfamylanthranilic acid of the formula

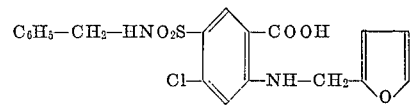

melting, after recrystallization from aqueous ethanol, at 200–201° with decomposition.

Example 3

The mixture of 3.5 g. 2,4-dichloro-5-furfurylsulfamyl-benzoic acid, 10 ml. 2-methoxy-ethanol and 3.9 g. furfurylamine is refluxed for 4 hours under nitrogen. After cooling to room temperature, it is poured into 50 ml. 2 N-hydrochloric acid and the precipitate formed filtered off. It is dissolved in 50 ml. 2 N-aqueous sodium hydroxide, the solution extracted with diethyl ether, the aqueous layer acidified with concentrated hydrochloric acid and the precipitate formed filtered off. It is recrystallized from aqueous ethanol to yield the N-furfuryl-4-chloro-5-furfurylsulfamyl-anthranilic acid of the formula

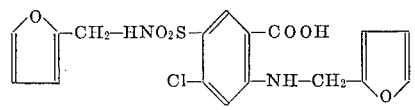

melting at 183–185° with decomposition.

The starting material is prepared as follows: To the solution of 27 g. furfurylamine in 150 ml. ethyl acetate, 20 g. 2,4-dichloro-5-chlorosulfonyl-benzoic acid are added portion-wise while stirring and the mixture is stirred at room temperature for 4 hours. The solids are filtered off, washed with ethyl acetate, the filtrate is evaporated in vacuo, the residue dissolved in water, and the solution acidified with 30 ml. concentrated hydrochloric acid. On cooling, crystallization occurs and the solid formed is filtered off. It is washed with water, dried, and recrystallized from aqueous ethanol to yield the 2,4-dichloro-5-furfurylsulfamyl-benzoic acid melting at 155–156°.

Example 4

The mixture of 3.5 g. 2,4-dichloro-5-furfurylsulfamyl-benzoic acid, 10 ml. 2-methoxy-ethanol and 4.3 g. benzylamine is refluxed for 4 hours under nitrogen. It is worked up as described in Example 3 to yield the N-benzyl-4-chloro-5-furfurylsulfamyl-anthranilic acid of the formula

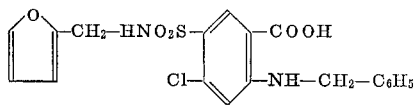

melting, after recrystallization from aqueous ethanol, at 189° with decomposition.

Example 5

The mixture of 3.7 g. 2,4-dichloro-5-(2-phenylethyl)-sulfamyl-benzoic acid, 10 ml. 2-methoxy-ethanol and 3.9 g. furfurylamine is refluxed for 4 hours under nitrogen. It is cooled to room temperature and poured into 50 ml. 2 N hydrochloric acid. The precipitate formed is filtered off, washed with water and dissolved in 2 N aqueous sodium hydroxide. The solution is extracted with diethyl ether, the aqueous layer separated and acidified with concentrated hydrochloric acid. After cooling the precipitate formed is filtered off and recrystallized from aqueous ethanol to yield the N-furfuryl-4-chloro-5-(2-phenyl ethyl)-sulfamylanthranilic acid of the formula

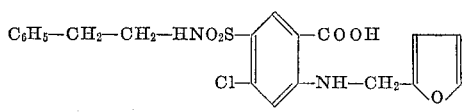

melting at 196–197°.

The starting material is prepared as follows: To the mixture of 9.7 g. 2-phenyl-ethylamine and 50 ml. ethyl acetate 5.8 g. 2,4-dichloro-5-chlorosulfamyl-benzoic acid are added portionwise while stirring. The mixture is then stirred for 4 hours at room temperature and filtered. The residue is washed with ethyl acetate, dried, suspended in water and the suspension acidified with 10 ml. concentrated hydrochloric acid while stirring. The supernatant solution is decanted off, the residue washed with water and dissolved in 2 N-aqueous sodium hydroxide. The solution is extracted with diethyl ether, the aqueous layer acidified with concentrated hydrochloric acid and the precipitate formed filtered off. It is recrystallized from aqueous ethanol to yield the 2,4-dichloro-5-(2-phenylethyl)-sulfamyl-benzoic acid melting at 169–171°.

Example 6

According to the method described in the previous examples, the compounds of the Formula V

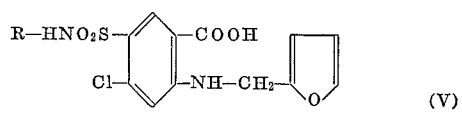

are prepared from equivalent amounts of the corresponding 2,4 - dichloro - 5 - R - sulfamyl - benzoic acid VI and furfurylamine. All compounds are recrystallized from aqueous ethanol.

| R | M.P. of V | M.P. of VI |
|---|---|---|
| ▷— | [1] 207–308° | 206–207° |
| ▷—CH$_2$— | 178–180° | 208–209° |
| ⬠—CH$_2$—CH$_2$— | [1] 180–182° | 156–157° |
| ⬡—CH$_2$— | 179–181° | 166–168° |
| furyl—CH$_2$— | 172–173° | 149–151° |
| C$_6$H$_4$F—CH$_2$— | 182–183° | 170–171° |

[1] Dec.

Example 7

The mixture of 3.0 g. N - furfuryl - 4 - chloro - 5 - benzylsulfamyl-anthranilic acid benzylamide, 30 ml. 2 N-aqueous sodium hydroxide, 10 ml. 2-methoxy-ethanol and 10 ml. water is refluxed for 2 hours and poured into 60 ml. 2 N hydrochloric acid. The supernatant solution is decanted off, the precipitate triturated with 10% aqueous potassium carbontae, the mixture filtered and the filtrate acidified with hydrochloric acid. The precipitate formed is filtered off and recrystallized from aqueous ethanol to yield the N - furfuryl - 4 - chloro - 5 - benzylsulfamyl-anthranilic acid melting at 200–201° with decomposition; it is identical with the product obtained according to Example 2.

The starting material is prepared as follows: The mixture of 9.0 g. 2,4 - dichloro - 5 - benzylsulfamyl - benzoic acid, 12 ml. thionyl chloride and 25 ml. ethyleneglycol dimethyl ether is refluxed for 1½ hours and evaporated in vacuo. The residue is triturated with hexane to yield the 2,4 - dichloro - 5 - benzylsulfamyl - benzoyl chloride melting at 125–128°.

The solution of 9.0 g. thereof in 100 ml. ethyl acetate is slowly added to 5.5 g. benzylamine in 50 ml. ethyl acetate. The mixture is allowed to stand overnight at room temperature, filtered and the filtrate washed with 2 N hydrochloric acid, water and 10% aqueous potassium carbonate. It is dried, evaporated and the residue recrystallized from aqueous ethanol to yield the 2,4-dichloro - 5 - benzylsulfamyl - benzoic acid benzylamide melting at 113–115°.

The mixture of 4.5 g. thereof, 4.0 g. furfurylamine and 15 ml. 2-methoxy-ethanol is refluxed under nitrogen for 3½ hours, cooled and poured into 100 ml. 2 N hydrochloric acid. The precipitate formed is triturated with diethyl ether, dissolved in ethyl acetate, the solution washed with water, dried, evaporated and the residue recrystallized from diethyl ether to yield the N-furfuryl-4 - chloro - 5 - benzylsulfamyl - anthranilic acid benzylamide melting at 130–132°.

I claim:

1. A member selected from the group consisting of the compound having the formula

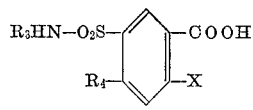

in which X is fluoro or chloro, R$_3$ is unsubstituted monocyclic 3 to 7 ring-membered cycloalkyl or cycloalkyl-lower alkyl, unsubstituted phenyl-lower alkyl or phenyl-lower alkyl substituted in the phenyl ring by one member selected from the group consisting of lower alkyl, and halogeno, in which radicals the lower alkyl moiety contains 1–4 carbon atoms, cinnamyl, tetrahydrofurfuryl, furfuryl, 2,3-dihydro- or tetrahydro-2-pyranylmethyl, 2-pyrrolidinoethyl, 2 - piperidinoethyl, 2 - (4 - methylpiperazino)ethyl or 2-morpholinoethyl, and $R_4$ is chloro or bromo; an alkali metal salt, a 1 to 4 carbon lower alkyl ester, benzyl ester or 2-phenylethyl ester, the amide, hydrazide or benzylamide of the carboxylic acid.

2. A compound as claimed in claim 1 in which formula $R_3$ is a member selected from the group consisting of benzyl, furfuryl, 2-phenyl-ethyl, cyclopropyl, cyclopropylmethyl, 2-cyclopentyl-ethyl, cyclohexylmethyl, tetrahydro-furfuryl and 2-fluoro-benzyl and each of $R_4$ and X is chloro.

References Cited
UNITED STATES PATENTS

| | | | |
|---|---|---|---|
| 3,072,656 | 1963 | Werner et al. | 260—397.7 |
| 3,009,910 | 1961 | Ziegler | 260—239.6 |

OTHER REFERENCES
Yale et al., J. Med. Chem. vol. 1, pp. 121–33 (1959).

HENRY R. JILES, Primary Examiner

H. I. MOATZ, Assistant Examiner

U.S. Cl. X.R.

260—518, 347.7, 326.82, 268, 247.1, 345.8, 293.4, 470, 556, 306.8, 307, 294.8, 239.6, 309.2, 244, 243, 239, 239.7, 239.8, 239.9, 239.95 397.7, 326.12; 424—228, 229